Patented Oct. 27, 1942

2,300,064

UNITED STATES PATENT OFFICE 2,300,064

MIXTURES OF RESINOUS MATERIALS

Raphael Rosen, Elizabeth, and William J. Sparks, Cranford, N. J., assignors to Jasco, Incorporated, a corporation of Louisiana No Drawing. Application July 13, 1938, Serial No. 218,948

8 Claims. (Cl. 260—42)

The present invention relates to valuable plastic composition and more especially to an improved mixture of resinous materials which have many industrial applications.

Polymers of iso-olefinic hydrocarbons, such as isobutylene, isoamylene and the like, are well known. The materials range from viscous liquids, with molecular weights from about 1,000 to 25,000 or 30,000 through a range of soft gummy and tacky solids having molecular weights of 80,000 to 100,000 and thence through a range of nontacky hard rubber-like solids having molecular weights from about 150,000 to 250,000. These products are made by polymerization of iso-olefins while in liquid phase at low temperatures below —20° C., and preferably at considerably lower temperatures, for example —60 and —100° C., using boron fluoride or equivalent Friedel Craft catalysts such as aluminum chloride, zinc chloride, iron chloride, titanium fluoride, etc. The catalysts may be dissolved in solvents such as ethyl or methyl chloride or fluoride.

These polymers are useful as such for various purposes, but it is desirable in many instances to harden and toughen them and to increase their tensile strength, for example, for bonding materials of various types such as metal surfaces, wood, fibers, clothes or bonding one of these materials to any other. Many of the industrial resins are not compatible with these polymers or at least are compatible only in small proportions which are insufficient to impart the hardness and toughness desired. Especially is this true of resins which are colorless and clear. It has been found, however, that the best resins answering these requirements are the polycoumarone and polyindene resins, or the so-called coumarone-indene resins, and particularly the highly purified colorless resins of this class. The indene resins and the coumarone-indene resins, in which the proportion of indene predominates over that of the coumarone, are much preferred for the present purposes because there is no oxygen in the first of these materials and the amount in the latter is quite small. These are miscible with the polyolefin polymers in all proportions and it is possible to make water white clear compositions whereas it is difficult to obtain colorless mixtures with polycoumarone. Where the coumaron-indene type is used it is preferable to employ those in which less than about 25% of coumarone is present, so that they are readily soluble in all proportions.

The materials may be mixed together on compounding rolls, preferably in a heated condition or in the presence in a solvent such as naphtha, benzol, toluene or the like. The solvent may be readily evaporated and the resin composition may be formed in any desired way, for example by rolling it into a sheet, casting, extrusion or the like. The proportion of the iso-olefin polymer to the coumarone, indene or coumarone-indene resin may vary considerably depending on the nature of the material desired and the molecular weight of the particular iso-olefin polymer. Where the lower molecular weight polymers are used less of the polymer is required but it is preferred to use polymers having molecular weights over 100,000 especially where inorganic fillers are absent, i. e. in clear, transparent mixtures. In such cases the amount of the polymer may be conveniently about 50% more or less. While the two substances mentioned above are the primary ingredients, it will be understood that other materials may be added such as fillers, pigments, additional resins, oils and the like, to obtain particular effects, but the composition of the two ingredients is highly desirable since when purified materials are obtained, the mixture is clear, colorless, hard and tough. It may be worked readily, however, by heating and may be cut or machined. As an example of the composition contemplated herein, the following is given:

Example I

The polymer selected was obtained by polymerization is isobutylene at a temperature well below —40° C., and having a molecular weight of about 70,000 as measured by Staudinger's method. It was an elastic rubber-like solid, clear, colorless, without either odor or taste, and neutral. It was highly soluble in hydrocarbon solvents. The resin selected was the commercial coumarone-indene resin having a specific gravity of 1.04 and an acid value less than .1. This material was colorless and in the form of glassy lumps. It was both tasteless and odorless. Its chemical analysis showed that it contained 87.7% carbon, 9.9% hydrogen, and 2.42% oxygen by difference. It was extremely hard and brittle. The two materials were then admixed in equal proportions by milling in small unheated rolls.

The mixture was clear, clean and colorless, soluble in hydrocarbon solvent and had good heat stability. It had a specific gravity of about 0.95.

The mixture was found to be tough and elastic. When tested on the Shore hardness tester it showed a value of over 30 units while the poly-isobutylene alone showed only 20. The mixture was not brittle like the polyindene resins and had no sharp or clearly defined softening point. When heated to 100° C. the mixture became very tacky and adhered to various surfaces tenaciously, such as glass, metal, fiber, paper, wood and the like.

Example II

A mixture of equal parts of poly-isobutylene and polyindene was prepared as above and about .2 gr. was placed between two tinned metal strips 6 inches long and 1 inch wide which overlapped about 1 inch thus giving 1 sq. in bonding area. The metal plates were then pressed together under pressure of 10,000 lbs./sq. in while heating the press platens to 110° C. Similar samples were made using the poly-isobutylene and the polyindene alone in place of this mixture. These three samples were then pulled transversely in a Scott tensile strength tester, with the following results:

| Sample | Tensile strength in pounds scale reading |
|---|---|
| Poly-isobutylene | No reading— 0 lbs. |
| Polyindene | No reading— 0 lbs. |
| Poly-isobutylene+polyindene 50% each | 178 lbs. |
| Do | 173 lbs. |
| Do | 176 lbs. |

On examining the test samples it was found that the mixture of poly-isobutylene and polyindene still adhered strongly to the metal sheets indicating that the adhesion to the metal is greater than the internal cohesion of the mixture.

The present invention is not limited to any theory of the methods for producing either of the constants or of the mixture itself, nor to any particular mixture or use thereof but only to the following claims in which it is desired to claim all novelty inherent in the invention.

We claim:

1. A new composition of matter comprising a mixture of a high molecular weight polymer of an isoolefin produced by a low temperature polymerization within the temperature range between —20° C. and —100° C. by the application of a Friedel Crafts catalyst to the liquefied olefin; and a polyindene resin containing negligible amounts of oxygen, the mixture being characterized by toughness, elasticity, adhesiveness and water-white clearness.

2. Composition according to claim 1 in which the iso-olefin polymer has a molecular weight in excess of 1,000.

3. Composition according to claim 1 in which the iso-olefin polymer has a molecular weight in excess of 25,000.

4. Composition according to claim 1 in which the iso-olefin polymer has a molecular weight in excess of 100,000.

5. A composition of matter comprising in combination a high molecular weight linear polymer of isobutylene and an indene resin, substantially free from other resins, characterized by toughness, homogeneity, elasticity, clear transparency, adhesiveness and thermoplasticity at temperatures in the neighborhood of 100° C. and an inorganic filler.

6. A composition of matter comprising in combination a high molecular weight linear polymer of isobutylene and an indene resin, substantially free from other resins, characterized by toughness, homogeneity, elasticity, clear transparency, adhesiveness and thermoplasticity at temperatures in the neighborhood of 100° C. and an auxiliary substance selected from the group consisting of fillers and pigments.

7. A composition of matter comprising in combination a high molecular weight linear polymer of isobutylene and an indene resin, substantially free from other resins, characterized by toughness, homogeneity, elasticity, clear transparency, adhesiveness and thermoplasticity at temperatures in the neighborhood of 100° C., the poly-isobutylene and the resin being present in approximately equal proportions.

8. A new composition of matter comprising a mixture of a high molecular weight polymer of iso-butylene produced by a low temperature polymerization within the temperature range between —20° C. and —100° C. by the application of a Friedel Crafts catalyst to the liquefied olefin; and a polyindene resin containing negligible amounts of oxygen, the mixture being characterized by toughness, elasticity, adhesiveness and water-white clearness.

RAPHAEL ROSEN.
WILLIAM J. SPARKS.